United States Patent
Levin et al.

(10) Patent No.: US 9,616,929 B2
(45) Date of Patent: Apr. 11, 2017

(54) CROSS-MEMBER AND METHOD FOR MOUNTING A COMPONENT TO A VEHICLE FRAME BEAM

(71) Applicant: VOLVO TRUCK CORPORATION, Göteborg (SE)

(72) Inventors: Göran Levin, Hisings-Kärra (SE); Bengt Kölqvist, Partille (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/895,244

(22) PCT Filed: Jun. 11, 2013

(86) PCT No.: PCT/SE2013/000098
§ 371 (c)(1),
(2) Date: Dec. 2, 2015

(87) PCT Pub. No.: WO2014/200392
PCT Pub. Date: Dec. 18, 2014

(65) Prior Publication Data
US 2016/0121929 A1 May 5, 2016

(51) Int. Cl.
*B60N 99/00* (2006.01)
*B62D 21/03* (2006.01)
(Continued)

(52) U.S. Cl.
CPC .............. *B62D 21/03* (2013.01); *B60G 7/02* (2013.01); *B62D 21/02* (2013.01); *B62D 21/11* (2013.01);
(Continued)

(58) Field of Classification Search
CPC ........ B62D 21/03; B62D 21/02; B62D 21/11; B62D 21/12; B62D 27/02; B62D 65/024;
(Continued)

(56) References Cited

U.S. PATENT DOCUMENTS

| 1,992,710 A | 2/1936 | Matthael |
| 5,205,587 A | 4/1993 | Orr |

(Continued)

FOREIGN PATENT DOCUMENTS

| CN | 201980293 U | 9/2011 |
| CN | 102765423 A | 11/2012 |

(Continued)

OTHER PUBLICATIONS

International Search Report (Feb. 7, 2014) for corresponding International App. PCT/SE2013/000098.
(Continued)

*Primary Examiner* — Lori L Lyjak
(74) *Attorney, Agent, or Firm* — WRB-IP LLP (57) ABSTRACT

A cross-member is provided for a vehicle having a frame structure including two longitudinal beams, wherein the cross-member includes a main portion and two end-sections wherein each end section includes an outer surface for facing an inner surface of a longitudinal frame beam wherein the cross-member includes at least one protrusion extending from the outer surface of the end-sections for being introduced into a hole or notch of the frame beam for forming a form-lock to one more components to be mounted to the longitudinal frame beam.

15 Claims, 3 Drawing Sheets

(51) Int. Cl.
  *B62D 21/02*  (2006.01)
  *B62D 21/11*  (2006.01)
  *B62D 21/12*  (2006.01)
  *B62D 27/02*  (2006.01)
  *B62D 65/02*  (2006.01)
  *B60G 7/02*  (2006.01)

(52) U.S. Cl.
  CPC ............. *B62D 21/12* (2013.01); *B62D 27/02* (2013.01); *B62D 65/024* (2013.01); *B60G 2200/31* (2013.01); *B60G 2204/143* (2013.01); *B60G 2204/4302* (2013.01); *B60G 2204/44* (2013.01); *B60G 2206/604* (2013.01); *B60G 2206/82* (2013.01)

(58) Field of Classification Search
  CPC  B60G 7/02; B60G 2200/31; B60G 2204/143; B60G 2204/4302; B60G 2204/44; B60G 2206/604; B60G 2206/82
  See application file for complete search history.

(56) References Cited

U.S. PATENT DOCUMENTS

| | | |
|---|---|---|
| 6,523,876 B1 | 2/2003 | Durand |
| 7,857,348 B2 | 12/2010 | Fleming |
| 2007/0194564 A1 | 8/2007 | Garceau et al. |
| 2008/0007096 A1 | 1/2008 | Fleming |
| 2008/0193258 A1 | 8/2008 | Legat et al. |
| 2009/0302179 A1 | 12/2009 | Krause et al. |
| 2010/0044139 A1* | 2/2010 | Kurokawa ............. B62K 11/00 180/311 |

FOREIGN PATENT DOCUMENTS

| | | |
|---|---|---|
| CN | 103085877 A | 5/2013 |
| WO | 2004058429 A1 | 7/2004 |
| WO | 2009062766 A1 | 5/2009 |

OTHER PUBLICATIONS

International Preliminary Report on Patentability (May 13, 2015) for corresponding International App. PCT/SE2013/000098.
European Search Report (Jan. 9, 2017) for corresponding European App. EP 13 88 6905.
Chinese Official Action (Jan. 24, 2017) for corresponding Chinese App. 201380077327.2.

* cited by examiner

CROSS-MEMBER AND METHOD FOR MOUNTING A COMPONENT TO A VEHICLE FRAME BEAM

BACKGROUND AND SUMMARY

The present invention relates to a cross-member for being connected to two longitudinal frame beams of a vehicle, i.e. frame beams positioned along the length of the vehicle, which cross-member also provides for a less complex and improved way of mounting components to the frame beam.

The mounting process of components to a vehicle chassis can be categorized into two main procedures, pre-assembly and final assembly. During pre-assembly, individual components are mounted together as modules, while final assembly represents the final mounting step where individual components or pre-assembled modules (units) are positioned at the correct position on the vehicle frame structure and thereafter mounted to the frame by fixing elements. Many types of mounting techniques are used in the automotive industry for fastening components to the chassis (frame structure) of a vehicle. Mounting generally includes the use of fixing elements, such as screws, rivets and/or bolts which connects the component to the frame beam.

In U.S. 2009/0302179, a holding device for fastening an add-on part to the frame structure of a vehicle is described. The holding device is fastened to an outer side of the frame structure. The holding device comprises a hook for fastening an add-on part to the frame structure, and the add-on part has a complementary shaped fixing surface so that a positive locking connection is formed between the holding device and the component.

It is in the interest for the vehicle industry to find improved ways of mounting components and modules to the chassis in order to find less costly and more ergonomic mounting methods. When mounting a component to a frame beam of a heavy vehicle there is often also a focus on achieving a connection between the component and the vehicle which has improved robustness.

It is desirable to find an improved way of mounting components to the frame structure with improved results in terms of increased robustness, improved ergonomics during mounting and maintenance, less complexity, and less mounting costs. In particular, it is desirable to find an improved way of mounting wheel suspension components to a vehicle frame structure and at the same time to achieve a more stable wheel axle construction.

According to an aspect of the invention, a vehicle having a frame structure comprising two longitudinal beams connected by a cross-member comprising a main portion and two end-sections wherein each end section comprises an outer surface for facing an inner surface of a longitudinal frame beam wherein the cross-member comprises at least one protrusion extending from the outer surface of the end-sections for being introduced into a hole or notch of the frame beam for forming a form-lock to one or more components to be mounted to the longitudinal frame beam.

The cross-member allows for that a more stable construction is achieved since the form-lock provides a tight connection with low tolerance distances and high connection area between the component and the cross-member. Further, the construction is stabilized since the outer surf of the cross-member is aligned to the inner surface of the frame beams. This results in a more stable connection of a component to the frame beam than adding a connection member to the outer surface of the frame beam for mounting the component.

Furthermore, by the form-lock and its position on the outer side of the end-sections of the cross-member, the cross-member can also provide direct mechanical support to the component to be attached. For example, this is important for large modules (units) to be mounted to both sides of the frame, such as a wheel axle suspension module.

In addition, by using the cross-member, the mounting procedure of the component is made less complex since the exact positioning of the component on the chassis becomes easier to find due to the protrusions of the cross-member extending on the outside of the frame beam, fewer fixing elements are needed, and due to the additional stability achieved by the cross-member, mounting steps can be moved from final assembly to pre-assembly procedure. For example, for a wheel axle suspension module, wheel alignment can be done already during a pre-assembly procedure. In addition, improved ergonomics for the worker is achieved as the form-lock created by the protrusion and the complementary recess makes it easy to assemble modules or complete units instead of mounting separate components. Also, the possibility to form-lock components directly to the protrusions on the cross-member reduces the amount of other types of fixing elements needed.

In embodiments of the invention, an outer portion of the protrusion is adapted for locking the component upwards and/or downwards relative a height direction of the vehicle. Thereby, the component can be significantly stabilized in vertical direction of the vehicle since any vertical forces to which the component is exposed will be directly distributed to the cross-member.

In embodiments of the invention, an outer portion of the protrusion is adapted for locking the component relative the length direction of the longitudinal frame beam. Thereby, the component can be significantly stabilized in length direction of the vehicle since any longitudinal forces to which the component is exposed will be directly distributed to the cross-member.

In embodiments of the invention, an outer portion of the protrusion is adapted for locking the component rotationally (R) relative a direction along the frame beams. This can be achieved for example by using at least one protrusion which outer portion has a non-circular cross-sectional area or by using at least two circular protrusions at each outer surface of the cross-member facing the inner surface of the frame beams. This is an efficient way of creating improved stability of a component to be mounted to a frame structure since the cross-member will support the component as an integrated part of the component.

In embodiments of the invention, an outer portion of the protrusion is adapted for locking the component in transverse direction relative the length direction of the longitudinal frame beam. The locking mechanism ensures a more exact positioning in transverse direction compared to the use of traditional fixing elements such as screws, rivets and bolts. When using screws, rivets and bolts the exact positioning is dependent on the worker mounting the component, while when using the form-lock, the component can be positioned more exactly in transverse direction. This combined with the direct connection to the cross-member results in a significantly increased robustness in transverse direction.

In embodiments of the invention, an inner portion of the protrusion is arranged to form a form-lock to the frame beam. Thereby, a form-lock between the frame and the cross-member is created in addition to the form-lock between the cross-member and the component. The cross-member will hence be fastened with increased robustness to the frame structure compared to attachment with only screws or bolts. Hence, the component will form an integrated unit with both the cross-member and the frame beams. Thereby, a high stability is achieved which is advantageous for components with high load impacts, for example a wheel axle suspension module. In other words, the protrusions are positioned on the frame structure with increased precision so that the resulting connection between the component and the protrusion can be superior compared to for example using a form-fit holder mounted to the outside of the frame by traditional fixing means. In order to obtain a similar locking function of the frame beam, the outer surface may alternatively comprise one or more additional protrusions, wherein the additional protrusions are arranged to form a form-lock between the cross-member and the frame beam.

In embodiments of the invention, the main portion of the cross-member comprises connection points for mounting additional functional components. Thereby, efficient mounting of components, such as a wheel axle suspension module may be achieved.

According to a second aspect of the invention, a vehicle comprises a cross-member as described above, wherein the cross-member is arranged between two longitudinal frame beams of the vehicle and the at least one protrusion extends through a longitudinal frame beam and forms a form-lock to the component, wherein the component comprises at least one recess with complementary shape compared to at least an outer portion of the at least one protrusion. As described above, such cross-member provides several advantages when used in a vehicle, in terms of higher stability of components mounted to frame using the cross-member as connector, less costly construction due to that the possibilities to use a less complex mounting process with fewer mounting steps in the final-assembly mounting procedure.

In embodiments of the invention, the component comprises additional connection points, for example threaded holes, for fixing the component (or module) to the protrusion, and/or to the frame beam. Thereby, the component may be fastened in the remaining directions where the protrusion does not form a lock. For example, in the case of mounting from the top, the component may be additionally fastened by fixing elements attached at the top of the protrusion. Also the component can be additionally fastened to the frame beam by traditional fixing elements.

In embodiments of the invention, the component to be connected to the frame beams is a driven or non-driven wheel suspension unit. It may be a rigid axle unit or an individual wheel suspension unit. For example, the wheel suspension unit may comprise at least two suspension brackets, which each comprise at least one recess with complementary shape compared to at least the outer portion of the protrusion for forming a form-lock to the cross-member and/or to the frame beams. Using the cross-member of the invention for mounting a wheel suspension module allows for a significant improvements during the mounting process as the exact position of the wheel assembly module allows for that the wheel alignment can be done as a pre-assemble mounting step. Today, the wheel assembly is first mounted to the frame and wheel alignment is done in the final assembly to the chassis. Further, the final assembly is made less complex as the form-lock allows for the use of less other fixing elements in the narrow space available in the chassis.

Furthermore, a significantly more stable construction is achieved due to the direct mechanical support of the cross-member and/or the frame beams created by the protrusions, which at least partly integrates the cross-member into the wheel suspension arrangement. For example, in the case of the use of an individual wheel suspension, the longitudinal frame beams of the vehicle can be exposed to rotational forces in transverse direction during travel. The direct connection to the cross-member via the form-locking protrusions at the two longitudinal frame beam results in an efficient stabilization of the frame beams in transverse direction. In contrast, today extra support structures are used in order to mitigate instability effects of such transverse rotational forces.

In embodiments of the invention, a height between an upper and lower surface of the end-sections may be smaller than the height of the cross-member. This allows for that cables and piping can be mounted along the inner side of the frame beam efficiently.

According to a third aspect of the invention, a method for mounting a component to a longitudinal frame beam of a vehicle comprises the steps of:

a) providing a cross-member according to the invention, b) providing a component having a recess which has an essentially complementary shape compared to at least an outer portion of the at least one protrusion;

c) inserting the at least one protrusion into a hole or notch of a frame beam so that at least an outer portion of the protrusion extends through the hole or notch and at an outer surface of the frame beam; and d) attaching the component to the frame beam by allowing the protrusion to be received in the recess of the component for forming a form-lock to the component.

The advantages of the method is that modular mounting is facilitated so that less mounting steps are needed in the final assemble, increased ergonomics, less complexity and reduced costs as explained above.

BRIEF DESCRIPTION OF THE DRAWINGS

The invention will be described in the following with reference to embodiments illustrated on the enclosed drawings, on which:

FIG. 1a shows a cross-member according to an embodiment of the invention and its use in a frame structure for a vehicle.

FIG. 1b shows a more detailed view of the protrusion arranged on the cross-member according to the embodiment shown in FIG. 1a.

DETAILED DESCRIPTION

Figures 1A, 1B:
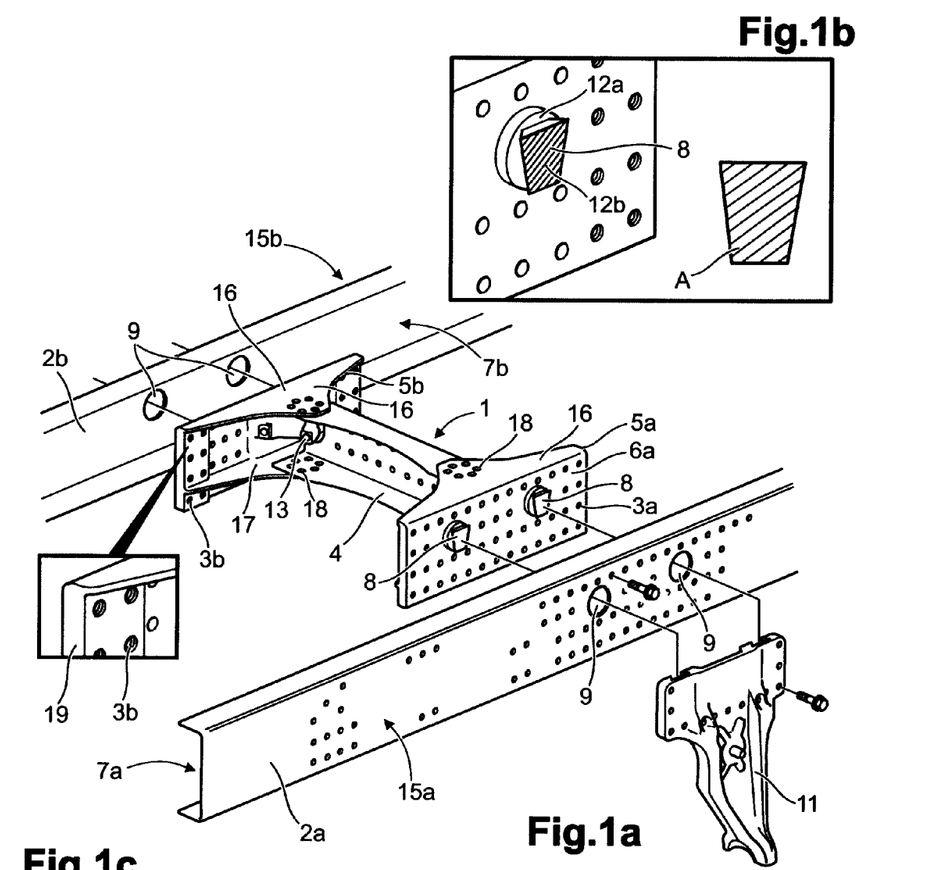

FIG. 1a shows a cross-member 1 according to a first embodiment of the invention and its use in a frame structure 2a, 2b for a vehicle. The cross-member according to the invention is applicable for any kind of vehicle but is particularly advantages for commercial vehicles, in particular trucks and tractors for hauling a trailer.

The cross-member 1 is a beam member which is adapted to be positioned in a transverse direction between two longitudinal frame beams 2a,2b. Longitudinal frame beams refers to frame beams which extend along the length of a vehicle. The two frame beams 2a, 2b may for example have U-profile cross-sections and may for example be perforated so that vehicular components can be attached to the beams.

The cross-member 1 comprises a main portion (an elongate member) 4 and two end-sections 5a, 5b. The elongate member 4 and the end-sections 5a, 5b may be formed as a one-piece component or may be formed by attaching two separate end-section components to an elongate beam. The elongate member 4 may have any suitable cross-sectional shape, such as a U-profile cross-section. The end-sections 5a, 5b may comprise connection points 3a, 3b for fastening the cross-member 1 to the longitudinal frame beams 2a, 2b. Each end section 5a, 5b comprises an outer surface 6a, 6b for facing the inner surface 7a, 7b of the longitudinal frame beam 2a, 2b. The end-sections 5a, 5b have a height which can be aligned to an inner surface 7a, 7b of the frame beams 2a, 2b, wherein the height of the outer surface of the cross-member 1 preferably correspond to the height of the inner surfaces 7a, 7b inside the frame beams 2a, 2b.

The cross-member 1 comprises at least one protrusion 8 extending from the outer surface 6a, 6b of the end-sections 5a, 5b for being introduced into a hole or notch 9 of the frame beam 2a, 2b for forming a form-lock to one or more components 11 to be mounted to the longitudinal frame beam 2a, 2b. Hence, at least one protrusion 8 is arranged on an outer surface 6a, 6b of the end-sections 5a, 5b. The at least one protrusion 8 is construed to extend through the longitudinal frame beam 2a, 2b. The frame beam 2a, 2b comprise a hole or notch 9 into which the at least one protrusion 8 can be inserted. In FIG. 1a, two protrusions 8 at each end-section 5a, 5b are shown as an example.

Hence, the protrusions 8 can be construed for being inserted into holes 9 of the frame beams 2a, 2b and to protrude from an outer surface 15a, 15b of each frame beam 2a, 2b. The inner surface 7a, 7b of the frame beams 2a, 2b are therefore located on opposite side of the frame beams 2a, 2b compared to the outer surfaces 15a, 15b. An example of a possible geometry of the protrusion is shown in more detail in FIG. 1b.

An outer portion 12b of the protrusion 8 is adapted to extend outwards from the outer surface 15a, 15b of the frame beam 2a, 2b. In this way, the outer portion 12b of the at least one protrusion 8 can act as a connection element between a component 11 and the frame beams 2a, 2b. A portion of the component 11 comprises a recess 14 which has a complementary geometry compared to at least the outer portion 12b of the protrusion 8, see FIG. 1c. Therefore, the protrusion 8 allows for that a form-lock between the cross-member 1 and the component 11 and/or a form-lock to the frame beam 2a, 2b can be achieved.

The cross-member 1 according to the present invention can be applied for attaching any kind of component, such as a bracket or module (i.e. an assembled unit of components) to the longitudinal frame beams 2a, 2b. For example, the component 11 according to the invention may be a bracket alone comprising at least one recessed area 14 for forming the form-lock, which bracket comprises connection points for at least one component or module. Alternatively, the recess 14 may be integrated on a component or module 11. The component 11 may be any component to be mounted to the frame structure 2a, 2b of the vehicle, such as a fuel tank, battery box or an after-treatment device. An important application of the invention is where the component 11 forms part of a wheel suspension module.

Form-lock is herein defined as a first part having a first shape and a second part having a second complementary shape/geometry, so that the first part can be locked to the second part, hindering movement of the parts in at least one direction in relation to each other. Hence, the form-lock is created by at least an outer portion 12b of the at least one protrusion 8 of the end-sections 5a, 5b and the corresponding complementary shaped recess/recesses 14 on the component 11 to be mounted to the frame beams 2a, 2b, see for example the area A in FIGS. 1b and 1c. Using complementary geometries for achieving a form-lock is also called form-locking, form-fit locking and positive locking-fit.

The form-lock may hence hinder the movement of the attached component 11 in a direction longitudinally, vertically, transversally, diagonally, and/or rotationally (R) in relation to the frame beams 2a, 2b. Vertical direction refers to a direction along the height of the vehicle, longitudinal direction is along the length of the frame beam, transverse direction is a direction transverse the length of the frame beam, and diagonal direction refers to a direction at any position in-between longitudinal, vertical and transverse direction. Rotational direction may be longitudinally, vertically, transversally, and/or diagonally in relation to the frame beam. In other words, an outer portion 12b of the protrusion 8 may be adapted for locking the component 11 upwards and/or downwards relative the height direction of a vehicle, and/or adapted for locking the component 11 relative the length direction of the longitudinal frame beam 2a, 2b, and/or adapted for locking the component 11 rotationally (R) relative a direction along the frame beams 2a, 2b, and/or adapted for locking the component 11 in transverse direction relative the length direction of the longitudinal frame beam 2a, 2b.

Preferably, an inner portion 12a of the protrusion 8 is arranged to form a form-lock to the frame beam 2a, 2b. Hence, the inner portion 12a of the protrusion 8 may comprise a geometrical shape which locks the cross-member 1 in a direction longitudinally, vertically, transversally, diagonally, and/or rotationally (R) in relation to the frame beam 2a, 2b. Hence, the hole or notch 9 of the frame beam 2a, 2b in this embodiment comprises a complementary shape compared to the inner portion 12a of the protrusion 8. Another way to achieve the same effect is that the outer surface 6a, 6b comprises a one or more additional protrusions 31, wherein the additional protrusions 31 are arranged to form a form-lock between the cross-member 1 and the frame beam 2a, 2b. Hence in addition to the hole or notch 9 for the at least one protrusion 8, the frame beam 2a, 2b may comprise at least one additional hole, notch or recessed area which has a complimentary geometry compared to the at least one additional protrusion 31.

Figure 1C:
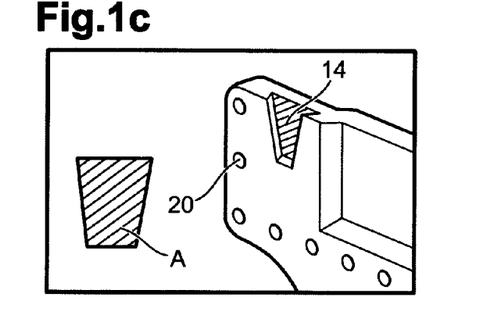
FIG. 1c shows a more detailed view of a recess arranged on the component to be mounted, which component has recess with a complimentary shape as the outer portion of the protrusion shown in FIG. 1b.

An advantageous geometry of the at least one protrusion 8 and at least one complementary recess 14 in the component 11 and the frame beam 2a, 2b is shown in FIGS. 1b and c. The inner portion 12a of the protrusion has a circular shape. Since two protrusions are provided at each outer surface 6a, 6b of the cross-member, rotational movement of the cross-member in mounted position relative to the frame beams 2a, 2b is prevented. The outer portion 12b of the protrusion 8 has cross-sectional area parallel to the outer surface 6a, 6b which has tapered shape. In addition, the cross-sectional area may also vary in size depending on the distance from the outer surface 6a, 6b. This results in both hindrance of rotational movement and movement in transverse direction relative the frame beam 2a, 2b of the component 11. Also the tapered shaped outer portion 12b of the protrusion 8 may provide for a stop position in height or length direction during mounting due to that the component comprises a shape which is complementary in relation to the outer portion of the protrusion. However, the invention is not limited to the geometry described above. The geometry and amount of protrusions 8 may be varied depending on the desired locking function and the specific mounting requirements of the component 11.

In addition, the cross-member 1 may comprise connection points 3a, 3b for connecting the outer surface 6a, 6b of the end-sections 5a, 5b to the frame beams 2a, 2b. Thereby, the fastening of the cross-member 1 to the frame beams 2a, 2b can be ensured. Further, the protrusion 8 may comprise one or more connection points for connecting the component 11 to the protrusion 8, for example a threaded hole. Thereby, the component can be fastened also in the movement directions which are not hindered by the form-lock. Besides from the recess 14, the component 11 may also comprise additional connecting points 20, for example threaded holes for fixing the component 11 to the frame beam 2a, 2b and/or the end-sections 5a, 5b of the cross-member 1. Preferably, such connection points 20 are symmetric with both the frame beam 2a, 2b and with holes in the component 11 so that fixing elements such as screws, rivets or bolts can be used for fastening both the cross-member 1 and the component 11 to the frame beam 2a, 2b simultaneously. It should be noted that the use of a form-lock to the frame beam 2a, 2b allows for that screwing is used as additional connecting means between the cross-member 1 and the frame beam 2a, 2b, since the form-lock can lock the cross-member 1 from rotational movement. This is possible even when high stability is required, such as for a wheel suspension module.

The end-sections 5a, 5b of the cross-member 1 may further comprise an upper 16 and a lower surface 17, preferably T-shaped surfaces, which extend horizontally. The surfaces may each comprise connection points 18 to the elongate member 4.

The cross-member 1 according to the invention may have further functionality besides connecting together longitudinal frame beams 2a, 2b and acting as a connection member. For example, a distance/height between the upper and lower surfaces 16 and 17 of the end-sections 5a, 5b may be smaller than the height of the cross-member. This is advantageous since thereby a space is created along the longitudinal frame beams 2a, 2b so that cables and pipes 30 can be mounted along the length of the longitudinal frame beams 2a, 2b. Further, the end-sections 5a, 5b may be reinforced at the outer edges 19 for further increasing the stability between the cross-member 1 and the longitudinal frame beams 2a, 2b. Such reinforcement may also comprise the connection elements 3a, 3b for connecting the cross-member to the frame beam 2a, 2b. The cross-member 1 thereby is even more stabilized inside the frame profile. Furthermore, the main portion 4 may comprise connection points 13 for mounting additional functional components. For example, an inner surface of the end-sections 5a, 5b may comprise connection points 13 for an additional vehicular component or module or connection points to the component 11. The connection points 13 may be arranged on an inner surface having an inclined angle to facilitate connection to certain components.

When mounting the cross-member 1 of the invention the following method is applied: providing a cross-member 1 according to an embodiment of the invention, providing a component 11 having a recess 14 which has an essentially complementary shape compared to at least an outer portion 12b of the at least one protrusion 8; inserting the at least one protrusion 8 into a hole or notch 9 of a frame beam 2a, 2b so that at least an outer portion 12b of the protrusion 8 extends through the hole or notch 9 and at an outer surface 15a, 15b of the frame beam; and attaching the component 11 to the frame beam 2a, 2b by allowing the protrusion 8 to be received in the recess 14 of the component 11 for forming a form-lock to the component 11.

The end-sections 5a, 5b may be connected to the frame beams 2a, 2b by fixing elements, such as screws, rivets and bolts. Hence, the end-sections 5a, 5b are positioned parallel and adjacent to the inner surface 7a, 7b of the frame beams 2a, 2b in mounted position. The method may hence further comprise, after providing the cross-member 1, the step of connecting the cross-member 1 to the frame beam by fixing means.

After the cross-member 1 is positioned between the frame beams 2a, 2b, the component 11 may be mounted to the protrusions 8 of the end-section 5a, 5b of the cross-member 1 in for example a top-down, down-top or a side movement relative the frame beam depending on size and available space present in the specific mounting situation. In addition to the form-lock created by the protrusion 8, the component 11 may be connected to the frame structure 2a, 2b and/or to the cross-member 1 by additional fixing means. The additional fastening of the component 11 to the frame beams 2a, 2b may include fastening to the protrusion 8; and/or fastening to the frame beam 2a, 2b by fixing means. Hence, the protrusion 8 may for example be provided with one or several connection points, such as threaded holes.

Figure 2:
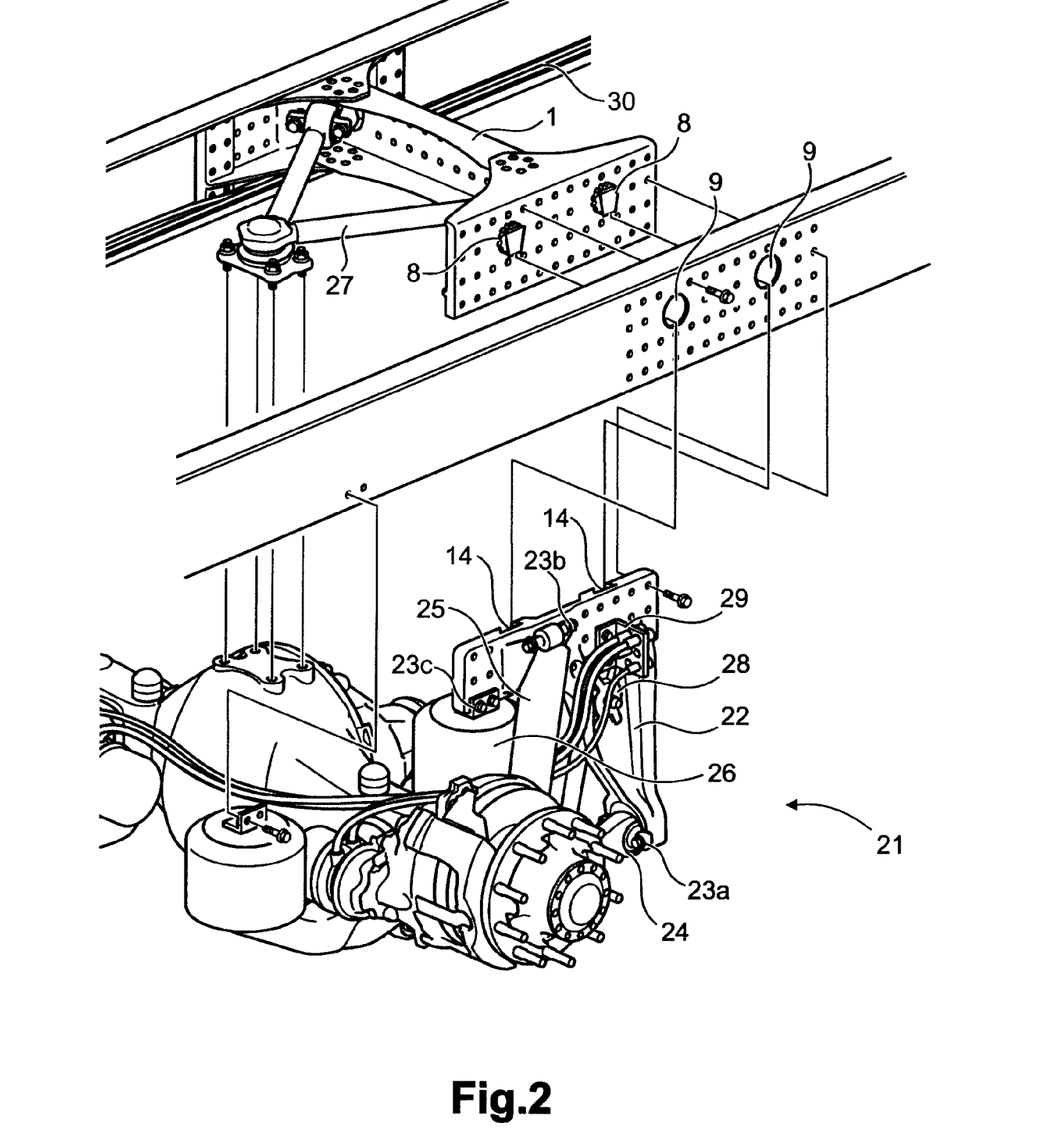
FIG. 2 shows the cross-member according to one embodiment of the invention and its use in a vehicle frame structure for connecting a wheel suspension module to the frame structure.

FIG. 2 shows an application of the invention where a cross-member 1 is mounted between the frame beams 2a, 2b of a vehicle. Hence, the cross-member 1 is arranged between two longitudinal frame beams 2a, 2b of the vehicle. At least one protrusion 8 extends through a longitudinal frame beam 2a, 2b and forms a form-lock to the component 11. The component 11 comprises at least one recess 14 with complementary shape compared to at least an outer portion 12b of the at least one protrusion 8. The cross-member 1 can be used as a connection element to a component 11 which is a driven or non-driven wheel suspension module 21. In FIG. 2, the wheel suspension module 21 comprises two brackets 22 each bracket 22 including at least one recess 14 with complementary shape compared to at least an outer portion 12b of the protrusions 8 for forming a form-lock to the cross-member 1. The brackets 22 are mounted using the form-lock created by the protruding portions 8 at the two outer surfaces 6a, 6b of the cross-member 1 and the recesses 14. Hence, the brackets 22 are mounted one at each outer side of the frame beams. The brackets 22 are further attached to the frame beams 2a, 2b by additional fixing means, such as screws. In this example, the brackets 22 comprise connection points 23a, 23b, 23c for suspension elements such as a reaction rod 24, hydraulic damper 25 and/or an air spring 26. Further the brackets 22 may include an attachment point 28 for a stabilizer bar. The brackets 22 may also include attachment points 29 for piping and cabling.

In FIG. 2, an additional vehicular component 27, a V-rod for a wheel suspension is mounted at connection points 13 at an inner surface of the end-sections 5a, 5b.

A particularly advantageous application of the invention is to combine the cross-member 1 where a form-lock is provided both to the frame beam 2a, 2b and the component 11, with a component 11 which is a wheel suspension module 21, since the form-lock between the cross-member 1 and the module 21 and the frame beams 2a, 2b results in a significant improvement of the robustness compared to solely using screws, rivets and bolts as fixing means. This is because the form-lock between the module 21 and the frame 2a, 2b and the cross-member protrusions 8 create a very close-fitted connection where the cross-member 1 will act as an integrated part of the wheel-suspension module 21. Therefore, the cross-member 1 provides mechanical support and stability to the wheel suspension module 21. Therefore, wheel alignment can be done already during pre-assembling. Hence, the wheel suspension module 21 may be a complete wheel axle module which is attached by an upwards movement in into the cross-member protrusions 8 extending on the two outsides of the frame beams, and fastened by additional connection elements. In FIG. 2, the component 21 is a wheel suspension module for a rigid axle. The invention is applicable for both driven and non-driven axles.

It should also be noted that the invention is not limited to a rigid axle module, but may also advantageously be applied for an individual wheel suspension module. For an individual wheel suspension module, the cross-member 1 provides a significant support in transverse direction, mitigating the negative effects of rotational forces in transverse direction.

The shape and the amount of protrusions 8 can be varied depending on the component 11 to be attached to the frame. For example, the protrusion may have a circular cross-sectional area parallel to the outer end-section surface 6a, 6b. Hence, the protrusion 8 comprising the portions 12a and 12b may have a cylindrical shape. However, in the case of only one protrusion present on the outer surface 6a, 6b, such shape may only lock the component 11, 21 in height direction, vertical direction and/or diagonally, and not lock the component rotationally (R) relative a direction along the frame beam.

Therefore, it is preferred to use a non-circular geometry of the cross-sectional area, or to use two or more cylindrical protrusions on each outer surface 6a, 6b.

In addition, depending on the mounting direction of the component 11 relative to the frame beams 2a, 2b, for example a top-down, down-top or side movement, the geometry of the protrusion 8 and the complementary recess 14 may be varied. For example, when the component 11, 21 is mounted in a side movement, the recess 14 may be a hole 9, while when the component 11 is mounted in top-down or down-top motion, the recess 14 should either be situated and an edge of the component 11 (hence being a notch) or the hole 9 needs to be increased so that there is an extra available free space which can be used for inserting the protrusion 8 into the recess 14. In the case where the protrusion has a cylindrical shape and is mounted in a down-top or top-down movement, the recessed area may be positioned at an outer edge of the component 11 which may be formed to receive the lower or upper half of the cylindrical protrusion.

FIG. 3a-e illustrate further examples of advantageous geometrical shapes of the at least one protrusion 8.

Figure 3A:
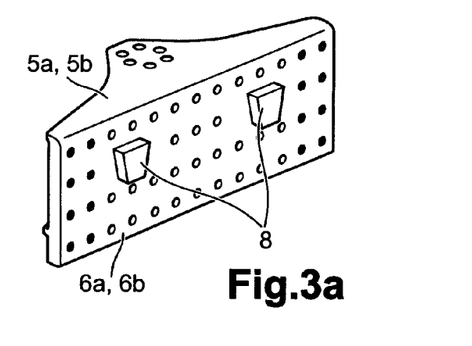
FIG. 3a-3e shows a few examples of end-sections comprising at least one protrusion for forming a form-lock to a component to be attached to the frame structure.

In FIG. 3a, the protrusions 8 forming a lock for the component 11, 21 have a tapered shaped cross-section. If the tapered shape is in height direction, the protrusion 8 is adapted for locking the component 11 upwards or downwards relative a height position. Hence, when the component 11, 21 is mounted in a down-top motion, the protrusions 8 form together with the complimentary shaped recess 14 a stop position in height for the component 11, 21 and a lock in longitudinal direction of the vehicle.

Figure 3B:
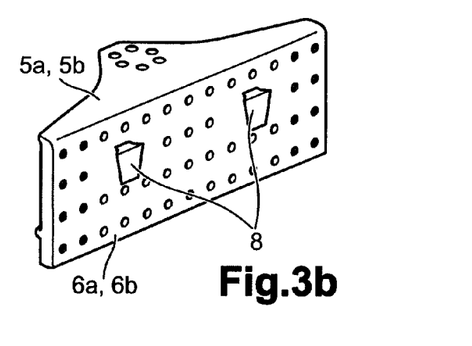

A further function of the protrusions 8 have been added in FIG. 3b. In addition to the tapered shaped cross-sectional area parallel to the outer surface 6a, 6b of the end-sections 5a, 5b, the cross-sectional area of the protrusion 8 also varies in size depending on the distance from the outer surface 6a, 6b of the end-section 5a, 5b. Thereby, movements in transverse direction relative the length direction of the longitudinal frame beam 2a, 2b can be minimized.

Figure 3C:
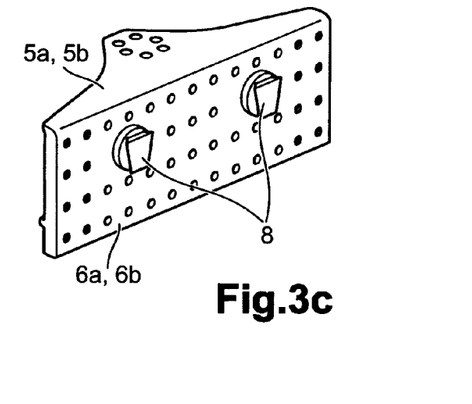

A further function of the protrusions 8 has been added in FIG. 3c, where the geometry of an inner portion 12a of the protrusion 8 is adapted to form a form-lock to the frame beam. Since two such protrusions are present on the outer surface 6a, 6b of the end-sections 5a, 5b, the circular shaped inner portions provides a form-lock in vertical, longitudinal and rotational direction. The outer portions 12b of the protrusions have the same functionality as the protrusions described in FIG. 3b.

Figure 3D:
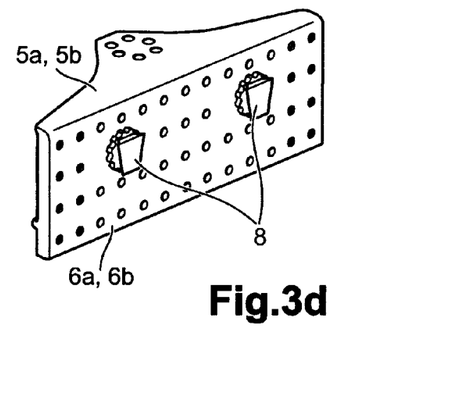

A further function of the protrusions 8 has been added in FIG. 3d, where an inner portion 12a of the protrusion 8 has a non-circular cross-sectional area parallel to the outer surface 6a, 6b of the end-section 5a, 5b, such as a shape with several edges, preferably a shape with more than 4 edges such as between 4-12 edges, for example a gearwheel type shape. This allows for the use of very small tolerances between the protrusion 8 and the frame structure 2a, 2b as the edges of protrusion are allowed to be slightly deformed at the insertion of the protrusions 8 into holes 9. Thereby, a very close-fitted connection between the cross-member and the frame can be achieved.

Figure 3E:
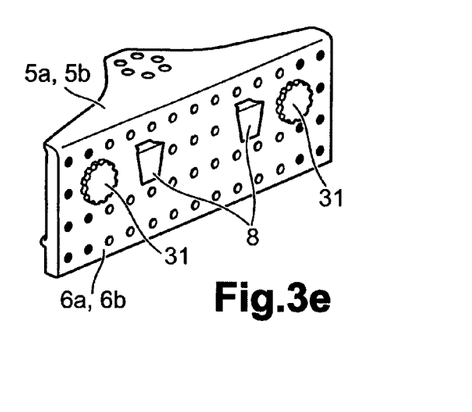

FIG. 3e shows an alternative embodiment which has similar advantages as the embodiment shown in FIG. 3d. In FIG. 3d, two tapered shaped protrusions 8 which also have varying cross-sectional size depending on the distance from the outer surface 6a, 6b for locking the cross-member 1 to the component 11, 21 are combined with the presence of two additional protrusions 31 which are located at the outer surface 6a, 6b, which additional protrusions 31 form a lock to the frame beam 2a, 2b.

Figure 3F:
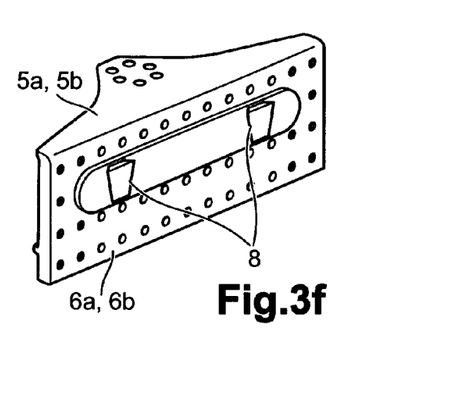

FIG. 3f shows as further alternative embodiment which has similar advantages as the embodiment shown in FIG. 3c. In FIG. 3f, two tapered shaped protrusions 8 with varying cross-sectional size depending on the distance from the outer surface 6a, 6b for locking the cross-member 1 to the component 1, 21 are shown, wherein the inner portion 12a of the protrusions 8 is one and the same for both protrusions 8 and is used for locking the cross-member to the frame-beam.

To summarize, the present invention relates to a cross-member 1 for a vehicle having a frame structure comprising two longitudinal beams 2a, 2b, wherein the cross-member 1 comprises a main portion 4 and two end-sections 5a, 5b comprising connection points 3a, 3b for fastening the cross-member 1 to the longitudinal frame beams 2a, 2b, wherein each end section 5a, 5b comprises an outer surface 6a, 6b for facing an inner surface 7a, 7b of a longitudinal frame beam 2a, 2b wherein the cross-member 1 comprises a protrusion 8 extending from the outer surface 6a, 6b of the end-sections 5a, 5b for being introduced into a hole or notch 9 of the frame beams 2a, 2b for forming a form-lock to one or more components 11 to be mounted to the longitudinal frame beam 2a, 2b.

The invention must not be regarded as being limited to the examples of embodiments described above, a number of further variants and modifications being feasible without departing from the scope of the following claims.

The invention claimed is:

1. A cross-member for a vehicle having a frame structure comprising two longitudinal beams, wherein the cross-member comprises a main portion and two end-sections wherein each end section comprises an outer surface for facing an inner surface of a longitudinal frame beam wherein the cross-member comprises at least one protrusion extending from the outer surface of the end-section for being introduced into a hole or notch of the frame beam for forming a form-lock to one or more components to be mounted to the longitudinal frame beam.

2. The cross-member according to claim 1, wherein an outer portion of the protrusion is adapted for locking the component upwards and/or downwards relative the height direction of a vehicle.

3. The cross-member according to claim 1, wherein an outer portion of the protrusion is adapted for locking the component relative the length direction of the longitudinal frame beam.

4. The cross-member according to claim 1, wherein an outer portion of the protrusion is adapted for locking the component rotationally (R) relative a direction along the frame beams.

5. The cross-member according to claim 1, wherein an outer portion is adapted for locking the component in transverse direction relative the length direction of the longitudinal frame beam.

6. The cross-member according to claim 1, wherein an inner portion (12*a*) of the protrusion is arranged to form a form-lock to the frame beam.

7. The cross-member according to claim 1, wherein the outer surface comprises a one or more additional protrusions, wherein the additional protrusions are arranged to form a form-lock between the cross-member and the frame beam.

8. The cross-member according to claim 1, wherein the main portion comprises connection points for mounting additional functional components.

9. A vehicle comprising a cross-member according to claim 1, wherein the cross-member is arranged between two longitudinal frame beams of the vehicle and the at least one protrusion extends through a longitudinal frame beam and forms a form-lock to the component, wherein the component comprises at least one recess with complementary shape compared to at least an outer portion of the at least one protrusion.

10. The vehicle according to claim 9, wherein the component comprises additional connection points, for example threaded holes, for fixing the component to the protrusion; and/or to the frame beam.

11. The vehicle according to claim 9, wherein the component to be connected to the frame beams is a driven wheel suspension module.

12. The vehicle according to claim 9, wherein the component to be connected to the frame beams is an individual wheel suspension module.

13. The vehicle according to claim 9, wherein the component is a driven or non-driven wheel suspension module which comprises to at least two suspension brackets which each comprise at least one recess with complementary shape compared to at least the outer portion of the protrusions for forming a form-lock to the cross-member.

14. The vehicle according to claim 9, wherein a height between an upper and lower surface of the end-sections may be smaller than the height of the cross-member.

15. A method for mounting a component to a longitudinal frame beam of a vehicle comprising
  a) providing a cross-member according to claim 1,
  b) providing a component which has an essentially complementary shape compared to at least an outer portion of the at least one protrusion;
  c) inserting the at least one protrusion into a hole or notch of a frame beam so that at least an outer portion of the protrusion extends through the hole or notch and at an outer surface of the frame beam; and
  d) attaching the component to the frame beam by allowing the protrusion to be received in the recess of the component for forming a form-lock to the component.

* * * * *